United States Patent [19]

Fitch

[11] Patent Number: 4,960,025
[45] Date of Patent: Oct. 2, 1990

[54] APPARATUS FOR SLICING MEAT STICKS

[76] Inventor: Clifford E. Fitch, R.R. #2 - Box 74C, Beecher, Ill. 60401

[21] Appl. No.: 421,337

[22] Filed: Oct. 13, 1989

[51] Int. Cl.$^5$ .............................................. B26D 7/06
[52] U.S. Cl. .................................... 83/703; 83/409.2; 83/411.2; 83/488
[58] Field of Search .................... 83/703, 409.2, 435.1, 83/411.2, 483, 485, 594, 676, 488, 487, 489, 410.9, 410.8; 30/389

[56] References Cited

U.S. PATENT DOCUMENTS

| | | | |
|---|---|---|---|
| 773,118 | 10/1904 | Carter | 30/389 |
| 3,086,567 | 4/1963 | Jetten | 30/389 |
| 3,851,554 | 12/1974 | Papai | 83/165 |
| 4,230,007 | 10/1980 | Grote et al. | 83/409.2 |

Primary Examiner—Frank T. Yost
Assistant Examiner—John M. Husar
Attorney, Agent, or Firm—Wallenstein, Wagner & Hattis, Ltd.

[57] ABSTRACT

An apparatus for slicing sticks of meat and applying the meat slices to a pizza for utilization in mass producing pizza is disclosed. The meat slicing apparatus 8 comprises a ring 24 having an inner cutting surface 25 and a platter 26 in spaced relationship below the ring opening 24a. The meat slicing apparatus 8 provides a motor 22 and a belt 28 for rotating the ring 24, and a hopper 16 for delivering meat sticks through the ring opening 24a onto the platter surface 26. The meat slicing apparatus also provides a mechanism for moving the ring 30 and platter 26 relative to the hopper 16 to cause the inner cutting surface 25 of the ring 24 to slice the meat stick.

10 Claims, 4 Drawing Sheets

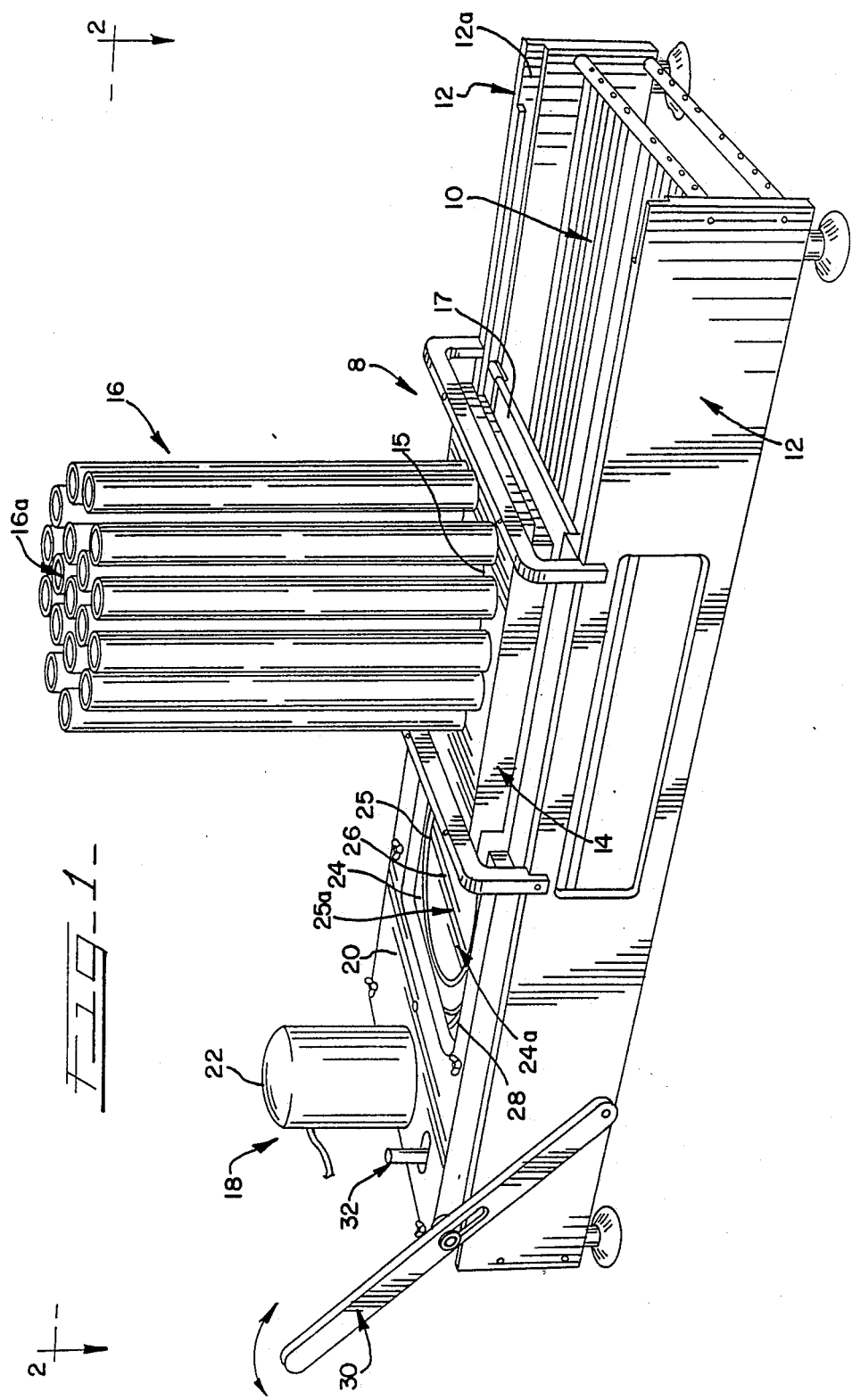

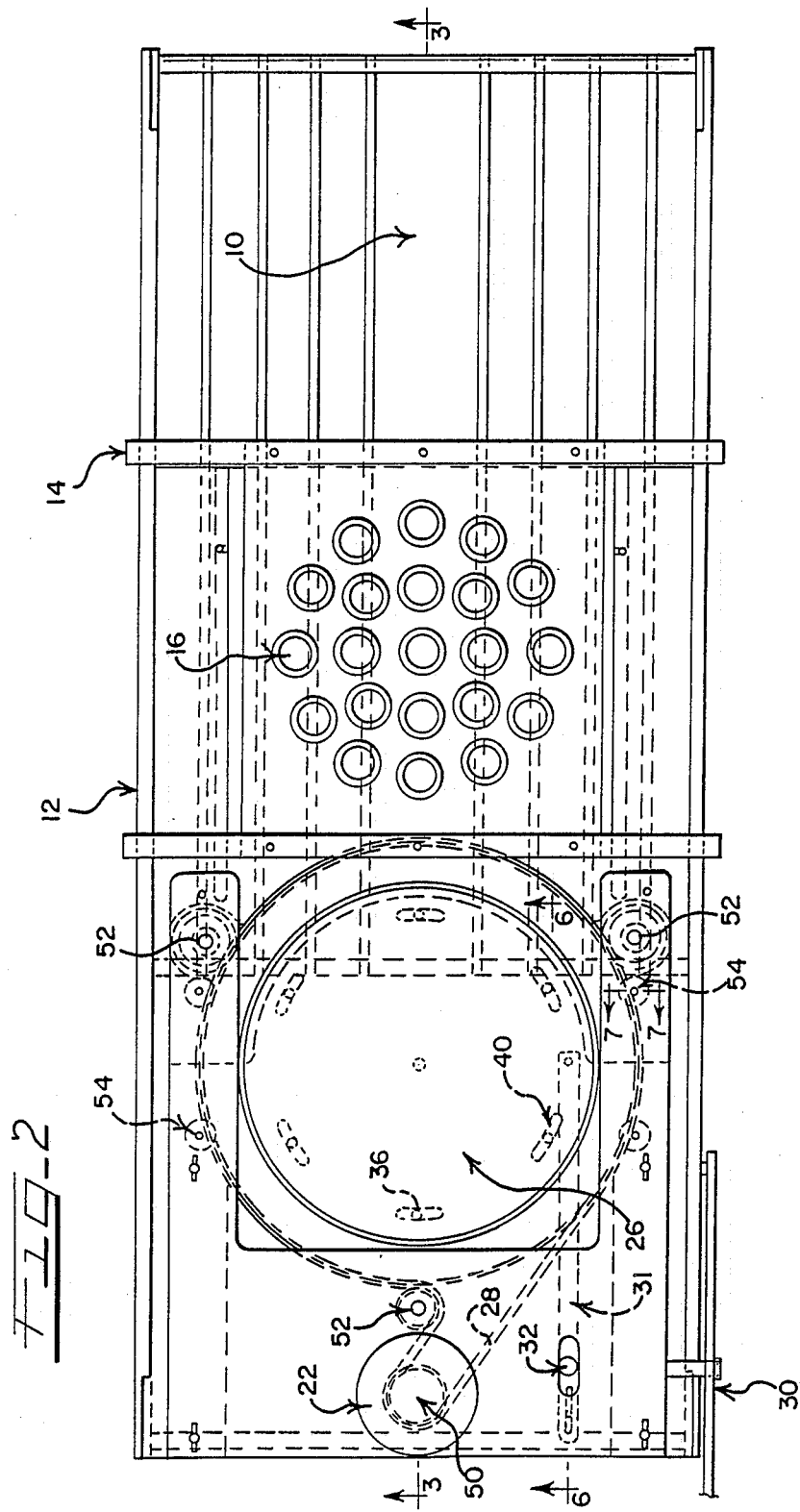

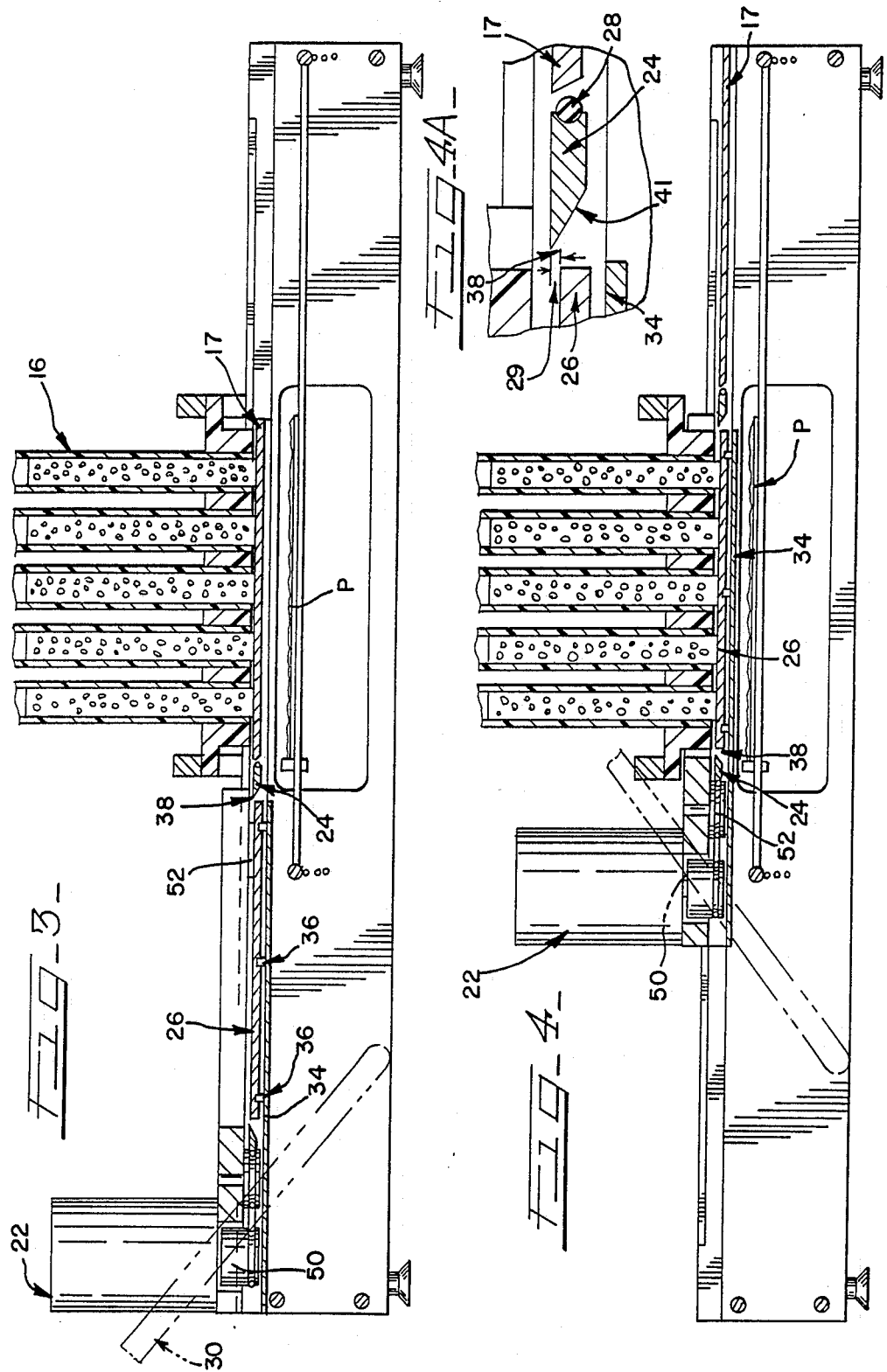

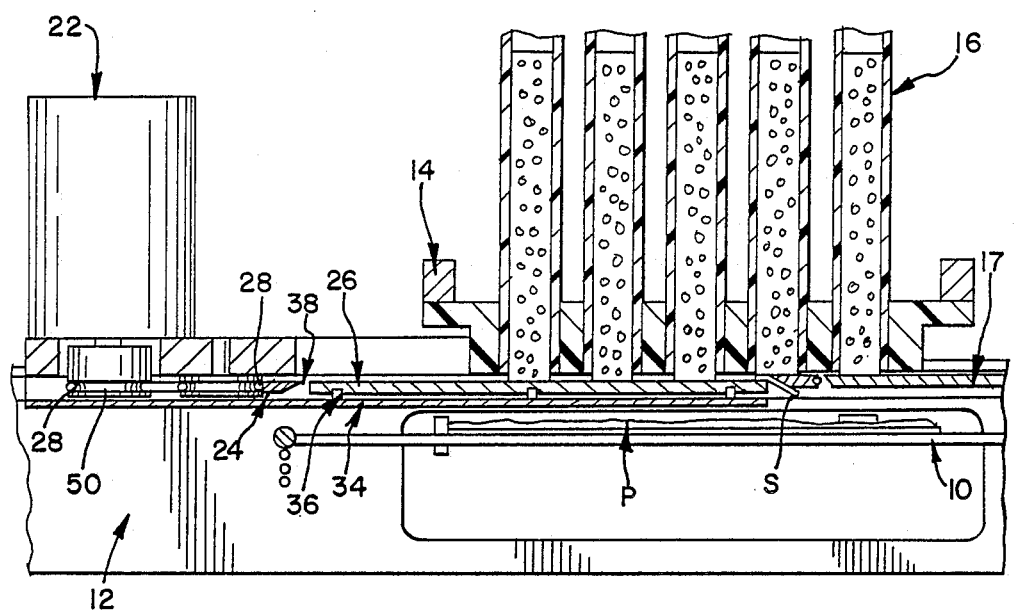
FIG-5-
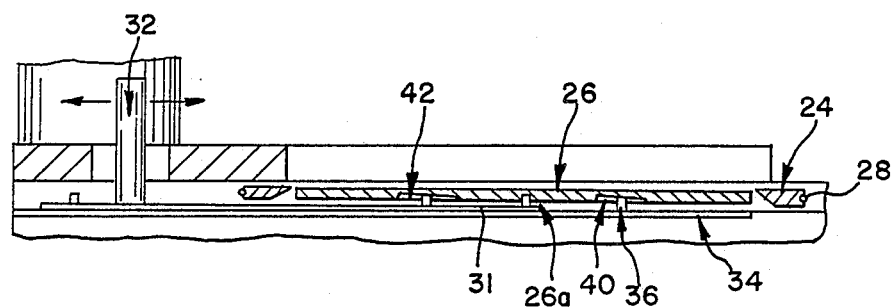
FIG-6-
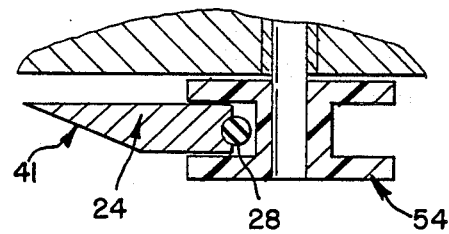
FIG-7-

APPARATUS FOR SLICING MEAT STICKS

DESCRIPTION

1. Technical Field

This invention relates generally to food handling machinery, and more particularly to equipment for slicing meat sticks and applying it to a pizza shell.

2. Background of the Invention

Mass produced pizzas, such as are commonly sold in grocery stores, are generally produced on an assembly line consisting of a series of food processing stations. For example, one station will prebake a pastry shell, another station will apply a sauce to the prebaked pastry shell, and the next station will apply cheese to the pizza shell. Following stations may add vegetables or other meats such as pepperoni. Pepperoni usually is made and sold in the form of a meat stick and must be sliced before applying it to a pizza shell.

Previous machines for cutting pepperoni and applying it to a pizza shell have been disclosed in Papai, U.S. Pat. No. 3,851,554, entitled "Pastry Shell Filling Apparatus," and Grote et al., U.S. Pat. No. 4,230,007 entitled "Flexible Meat Slicing Blade and Support Therefor."

Grote discloses an apparatus for cutting of meat sticks with a band-type blade. The blade is housed in a longitudinally extending groove or recess designed to receive the cutting blade. This housing not only provides for alignment and support for the blade, but also acts as a receptacle for meat slivers that get pushed into the recess during the course of cutting meat. The necessarily narrow size of this recess makes it difficult to clean, and usually requires an operator to remove the bandtype blade for cleaning. These meat slivers may also cause difficulty in cutting, and can lead to breakage of the blade. Further, as the band-type blade is made of thin, flexible material it can easily break if the blade gets caught on a meat stick.

Papai discloses a pastry shell filling apparatus that includes a station for slicing sausage sticks. The station provides cutting with a disc shaped blade having an outer periphery cutting surface, and deposits the severed slice of meat onto the pizza shell using an inclined chute.

The use of the chute to deposit the slices of meat onto the pizza shell car lead to nonuniform application of the meat onto the pizza shell. Accordingly, in column 11 of Papai it is noted that it may be necessary to perforate the chute and pass air through the perforations to provide a cushion of air on which the severed meat may ride. When a severed slice of meat gets stuck on the chute or slows down going down the chute, it can block other slices. Such block could cause nonuniform application of pepperoni to many pizza shells until the block is cleared.

As mentioned above, Papai discloses cutting on the outer periphery of a circular blade. Therefore, during cutting of the meat sticks, the cut sticks must necessarily rest on the top of the spinning blade. The increased friction from these meat sticks may cause a reduction in the speed of the blade resulting in slower cutting, which in turn results in nonuniform application of meat to the pizza shell.

The present invention is provided to solve these and other problems.

SUMMARY OF THE INVENTION

It is an object of the invention to provide an apparatus for slicing sticks of meat and applying it to a pizza shell.

According to the present invention, the apparatus for slicing meat has a cutting mechanism including a platter having a platter surface, and a blade comprising a ring having an inner cutting surface in spaced relationship with the platter surface. The inner cutting surface defines a ring opening. The apparatus further includes a means for rotating the ring, a hopper for delivering a meat stick through the ring opening and into contact with the platter surface, and means for moving the platter and ring relative to the hopper so that the inner cutting surface of the ring slices the meat stick.

The diameter of the platter is less than the diameter of the ring opening so that a gap is formed along the inner cutting surface of the blade. This gap allows for the severed meat slices to pass through it onto a pizza shell below.

To provide cutting, the ring is rotated by a motor. The motor frictionally engages a belt that wraps around and frictionally engages the outer periphery of the ring.

The rotating ring and platter are moved toward the hopper by moving a lever that is fixedly attached to the cutting mechanism. The hopper comprises a cylindrical tube that is directed substantially towards the platter surface. The cutting mechanism is moved toward the hopper until the meat stick is delivered to the surface of the platter. At this time the meat is supported by the platter on the inner periphery of the ring. As the cutting mechanism is moved away from the hopper, the inner cutting surface of the ring operatively engages the meat stick, slicing the meat. The sliced meat passes along a taper formed by the inner cutting surface of the ring, through the gap between the platter and the ring and is deposited onto the pizza shell.

The thickness of the slice of meat is determined by the difference in levels between the ring and the platter. The level of the platter is adjustable to vary the thickness of the slice.

The means for adjusting the level of the platter surface relative to the ring comprises a means for rotating the platter on a plurality of support posts that ride inside a corresponding number of indexed slots located on the underside of the platter. Each indexed slot defines an inclined plane channel in which the supporting posts ride. The means of rotating the platter comprises a thickness adjustment arm fixedly attached to the underside of the platter and on the outer periphery of the platter such that when the thickness adjustment arm is moved longitudinally the platter rotates. As the platter is rotated, the support posts ride up or down in the inclined plane channels, causing the platter to raise or lower.

BRIEF DESCRIPTION OF DRAWINGS

FIG. 1 is a perspective view of the meat slicing apparatus according to the invention;

FIG. 2 is a plan view of the meat slicing apparatus of FIG. 1

FIG. 3 is a side-elevational view cross sectioned along line 3—3 of FIG. 2, with the cutting ring in the non-cutting position;

FIG. 4 is elevational view cross sectioned along line 3—3 of FIG. 2, with the cutting ring in the cutting position;

FIG. 4a an enlarged view of the taper of the inner cutting surface, the gap along the cutting edge of the inner cutting surface, and the difference in levels of the platter and the inner cutting surface;

FIG. 5 is a side elevational view cross sectioned along line 3—3 of FIG. 2, with the cutting ring cutting and depositing it on the underlying shell;

FIG 6 is a sectional view taken along line 6—6 in FIG. 2 of the indexed slots on the underside of a platter that provide a means for adjusting of the thickness of the meat slices; and FIG. is a cross sectional view taken along line 7—7 FIG. 2 of the cutting ring, the drive belt, and the support pulleys in which it rotates.

DETAILED DESCRIPTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

FIG. 1 shows an embodiment of the present invention in the form of a meat slicer for slicing sticks of meat, such as for application on a pizza. The meat slicer 8 as illustrated in FIG. 1 is positioned in a non-cutting position. The meat slicer 8 comprises an adjustable horizontal pizza shelf 10 supported by two side walls 12. The side walls 12 support a stationary holder 14 in a plane parallel to the horizontal shelf 10. The stationary holder 14 has a plurality of holes 15 extending therethrough to receive cylindrical tubes 16. The cylindrical tubes 16 have open upper ends 16a in which sticks of product, such as a pepperoni sticks, are vertically disposed, one above each of the holes 15. The pepperoni sticks are dropped into the open upper ends 16a of the tubes 16 and are fed by gravity out through open bottom ends 16b. The holes 15 and respective tubes 16 are arranged in the stationary holder 14 in a pattern on which the pepperoni slices are to be deposited on the pizza shell. A table 17 supports the pepperoni sticks underneath the stationary holder 14.

A cutting mechanism 18 includes an upper shelf 20 that supports an electric motor 22, and a cutting ring 24. The cutting ring 24 has an inner cutting surface, or blade, 25 defining a ring opening 25a. A platter 26 is disposed in spaced relationship below the inner periphery of the cutting ring 24. A belt 28 frictionally engages the outer periphery of the cutting ring 24, as discussed in greater detail below.

In order to provide slicing of the pepperoni sticks, the two side walls 12 form channels 12a in which the cutting mechanism 18 traverses in a longitudinal, reciprocating fashion between noncutting, and cutting positions. When in the noncutting position, the table 17 supports the lower ends of the pepperoni sticks. A lever 30 is fixedly attached to the upper shelf 20 to move the cutting mechanism 18 between the cutting and non-cutting positions. A thickness adjustment post 32 is provided to permit adjustment of the height of the platter 26 relative to the cutting ring 24 to thereby permit adjustment of the thickness of the meat slice as discussed below.

When the cutting mechanism 18 is moved into the cutting position by moving lever 30 in the direction of the stationary holder 14, the ends of the meat in the cylindrical tubes 16 slide along the surface of the table 17, then over the outside of the cutting ring 24, and then the pepperoni sticks fall by gravity onto the platter surface 26. When the lever 30 abuts the stationary holder 14, the cutting mechanism 18 is in the cutting position and each of the meat sticks is resting on the platter 26 within the inner periphery of the cutting ring 24.

As the cutting mechanism 18 is then moved back, leftward as viewed in FIG. 1, to the non-cutting position by moving the lever 30 away from the stationary holder 14, the meat sticks are sliced by the trailing edge of the blade 25 which severs the meat and deposits the slices through a gap 38 FIGS. 3, 4 and 5 onto an awaiting pizza P FIG. 3. It should be understood that a plurality of such slices are simultaneously produced and deposited on top of the pizza P.

FIG. 3 illustrates the meat slicer 8 in the non-cutting position. As indicated above, the thickness of the slice depends on the distance between the blade 25 and the platter 26. In order to adjust this distance, six support posts 36 are mounted on a lower shelf 34 and support the platter 26. As will be shown in greater detail below, these support posts 36 ride in indexed slots 40. The level of the platter 26 is respectively raised and lowered by rotating the platter 26 relative to the support posts 36. FIG. 3 also shows the pizza P supported by the horizontal pizza shelf 10 underneath the stationary holder 14.

FIG. 4 shows the meat slicer 8 in the cutting position. While the meat slicer 8 is in the cutting position, all the pepperoni sticks are supported by the platter 26 below the ring opening 24a.

As the lever 30 is moved away (leftward) from the stationary holder 14, the blade 25 of the rotating cutting ring 24 slices the pepperoni sticks.

FIG. 5 shows the cutting ring 24 cutting one of the pepperoni sticks into a slice S. A taper 41 of the ring 24 is formed by the outwardly tapering surface of the blade 25 extending from the top to the bottom surface of the ring 24. The taper 41 guides the slice S through the gap 38 between the platter 26 and the ring 24, onto to the pizza P.

FIG. 4a illustrates in greater detail the gap 38 between the cutting ring 24 and the platter 26, and the taper 41 of the cutting ring 24, the difference in levels 29 between the platter 26 and the ring 24. As discussed above, this difference 29 determines the thickness of the slice of meat.

FIG. 6 illustrates one end of the thickness adjustment arm 31 attached to the thickness adjustment post 32, and the other end of the thickness adjustment arm 31 is attached to a bottom surface 26a of the platter 26, on the platter's 26 outer periphery.

The bottom surface 26a of the platter 26 has six indexed slots 40 uniformly distributed every 60 degrees. Each of the indexed slots 40 forms a channel in which a respective one of the support posts 36 rides. The indexed slots 40 have a sloping surface 42 forming an inclined plane.

To provide adjustment of the level of the platter 26, the thickness adjustment post 32 is moved longitudinally, which in turn moves the thickness adjustment arm 31 longitudinally, thereby rotating the platter 26. As the platter 26 rotates, each of the support posts 36 ride up or down inside the respective indexed slots 40, causing the platter 26 to respectively raise or lower.

FIG. 2 is a plan view of the meat slicer shown in the non-cutting position. In order to rotate the cutting ring 24 a drive pulley 50 is attached to the electric motor 22, and is coupled to a series of guide pulleys 52, and the outer periphery of the cutting ring 24 by the belt 28. The motor 22, when rotating, rotates the drive pulley 50, the guide pulleys 52, and the cutting ring 24.

FIG. 7 illustrates a support bushing 54 that supports the cutting ring 24, and a groove 55 in the outer periphery of the cutting ring 24 that receives the belt 28.

While the specific embodiments have been illustrated and described, numerous modifications come to mind without significantly departing from the spirit of the invention and the scope of protection is only limited by the scope of the accompanying claims.

I claim:

1. An apparatus for slicing sticks of food product and applying it to a substrate comprising:
   a cutting mechanism including a platter having a platter surface for supporting said substrate, a ring having an inner cutting surface in spaced relationship with said platter surface, said ring inner cutting surface having an upper and lower surface, said ring inner cutting surface being outwardly tapered from said upper surface to siad lower surface, and means for rotating said ring;
   means for delivering a food product stick through said ring opening and into contact with said platter surface; and
   means for moving said platter and said ring in tandem relative to said food product stick delivery means, said moving operative to cause said inner cutting surface to slice said food product stick.

2. The apparatus of claim 1 wherein said platter has an outer diameter less than the diameter of said ring opening.

3. The apparatus of claim 1 wherein the ring rotating means comprises a motor.

4. The apparatus of claim 3 including a belt coupling said motor to the outer periphery of said ring.

5. The apparatus of claim 1 wherein the means for moving said cutting mechanism relative to said meat stick delivery means comprises a lever coupled to said cutting mechanism.

6. The apparatus of claim 1 wherein the food product stick delivery means comprises a cylindrical tube directed substantially towards said platter surface.

7. The apparatus of claim 1 wherein said food product stick comprises a stick of meat.

8. The apparatus of claim 1 including means for adjusting the level of siad platter surface relative to said ring.

9. The apparatus of claim 8 wherein said platter includes an underside surface and the platter adjusting means comprises a plurality of indexed slots disposed on said underside surface, each of said indexed slots defining an inclined plane, a plurality of support posts that rid inside a corresponding number of said indexed slots, and a means for rotating said platter relative to said support posts.

10. The apparatus of claim 9 wherein the platter rotating means comprises a thickness adjustment arm rotatably attached to the underside of said platter.

* * * * *